(12) United States Patent
Lee et al.

(10) Patent No.: US 9,377,176 B2
(45) Date of Patent: Jun. 28, 2016

(54) OPTICAL DEVICE FOR FORMING A LIGHT BEAM

(75) Inventors: Kwan Nai Lee, Eindhoven (NL); Maarten Van Lierop, 's-Hertogenbosch (NL); Albert Bijlsma, Best (NL); Barry Mos, Bocholt (BE); Petrus Gerardus Josephus Maria Nuyens, Ruurlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 206 days.

(21) Appl. No.: 14/113,588

(22) PCT Filed: Apr. 27, 2012

(86) PCT No.: PCT/IB2012/052106
§ 371 (c)(1),
(2), (4) Date: Oct. 24, 2013

(87) PCT Pub. No.: WO2012/150533
PCT Pub. Date: Nov. 8, 2012

(65) Prior Publication Data
US 2014/0049959 A1   Feb. 20, 2014

(30) Foreign Application Priority Data

May 5, 2011   (EP) ..................................... 11164927

(51) Int. Cl.
*F21V 5/04*   (2006.01)
*G02B 19/00*   (2006.01)
(Continued)

(52) U.S. Cl.
CPC ... *F21V 5/04* (2013.01); *F21K 9/50* (2013.01); *G02B 19/0028* (2013.01);
(Continued)

(58) Field of Classification Search
CPC ............ F21V 5/04; F21V 5/007; F21K 9/50; F21K 99/00; F21W 2131/103; F21Y 2105/001; G02B 19/006; G02B 19/0028
See application file for complete search history.

(56) References Cited

U.S. PATENT DOCUMENTS

| 7,674,019 B2 | 3/2010 | Parkyn et al. |
| 2006/0018010 A1 | 1/2006 | Blumel |

(Continued)

FOREIGN PATENT DOCUMENTS

| CN | 201434331 Y | 3/2010 |
| CN | 101696784 A | 4/2010 |

(Continued)

OTHER PUBLICATIONS

Kai Wang et al; "Design of Compact Freeform Lens for Application Specific Light-Emitting Diode Packaging", Optics Express, vol. 18, No. 2, Jan. 18, 2010, pp. 413-425.

*Primary Examiner* — Y M Lee
(74) *Attorney, Agent, or Firm* — Meenakshy Chakravorty (57) ABSTRACT

The present invention relates to an optical device (229) for forming a light beam, which optical device comprises a lens (330) having a top section (331) configured to receive light emitted by a light source (220), a bottom section (332) configured to allow the received light to exit the lens, and a plurality of side sections (333) stretching from the top section to the bottom section. The plurality of side sections enclose the lens and are adapted to reflect and refract incident rays of the received light. A cross-section (334) of the lens, in a plane perpendicular to a center axis (338) stretching from the top section to the bottom section, has the shape of a polygon, which polygon is oriented in a length-wise direction (335) and in a transversal direction (336) being perpendicular to each other. Furthermore, the lens is adapted such that the received light exits the lens as a light beam formed to an elongated shape (5) at a predetermined distance (4) from the optical device. With the presented optical device, a compact lens enabling for a desired elongated illumination distribution is provided.

11 Claims, 4 Drawing Sheets

(51) Int. Cl.
*F21K 99/00* (2016.01)
*F21V 5/00* (2015.01)
*F21W 131/103* (2006.01)
*F21Y 105/00* (2016.01)
*F21Y 101/02* (2006.01)

(52) U.S. Cl.
CPC ............ *G02B 19/0066* (2013.01); *F21V 5/007* (2013.01); *F21W 2131/103* (2013.01); *F21Y 2101/02* (2013.01); *F21Y 2105/001* (2013.01)

(56) References Cited

U.S. PATENT DOCUMENTS

| | | |
|---|---|---|
| 2006/0138437 A1 | 6/2006 | Huang et al. |
| 2007/0152674 A1 | 7/2007 | Hubbell |
| 2008/0151550 A1 | 6/2008 | Liu et al. |
| 2010/0012354 A1 | 1/2010 | Hedin et al. |
| 2010/0073938 A1 | 3/2010 | Ho |
| 2010/0110676 A1 | 5/2010 | Falicoff et al. |
| 2010/0128488 A1* | 5/2010 | Marcoux .................. 362/311.02 |
| 2010/0201280 A1 | 8/2010 | McKenzie et al. |
| 2011/0007513 A1 | 1/2011 | Zhang et al. |
| 2011/0096533 A1 | 4/2011 | Sekela et al. |
| 2011/0103070 A1* | 5/2011 | Zhang et al. ............. 362/311.02 |
| 2011/0304269 A1* | 12/2011 | Wang ............................ 315/113 |

FOREIGN PATENT DOCUMENTS

| | | |
|---|---|---|
| CN | 201487808 U | 5/2010 |
| DE | 102006035635 A1 | 2/2008 |
| EP | 2135005 B1 | 4/2008 |
| WO | 2008122941 A1 | 10/2008 |

\* cited by examiner

OPTICAL DEVICE FOR FORMING A LIGHT BEAM

TECHNICAL FIELD

The present invention relates to an optical device for forming a light beam. The invention also relates to a corresponding lighting arrangement comprising such an optical device and a lighting system comprising a plurality of such lighting arrangements.

BACKGROUND OF THE INVENTION

Recent advances in LED (light emitting diodes) technology are revolutionizing the worldwide lighting industry by making possible the design of lighting arrangements that are more energy-efficient, longer-lasting, more durable, and more environmentally friendly than existing lighting technologies. LED lighting hence promises to become the major light source of the near future, not only to save energy, but also because the small size and the high efficiency of LEDs promote far more versatility of applications than did previous lighting technology. By mixing differently colored LEDs, any number of colors can be generated, with the color of the generated light being determined by the LEDs that are used as well as by the mixing ratios.

When it comes to lighting systems intended for street lighting, illumination of a preferably rectangular zone is desired, while consideration needs to be taken to regulations with regards to lighting uniformity, lighting intensity, glare and sky pollution. Traditionally, light sources such as high intensity discharge lamps e.g. sodium vapour lamps, fluorescent balloons or fluorescent tubes are commonly used. However, these kinds of light sources are quite bulky and hence vulnerable during windy weather conditions, and they require a frequent and time consuming maintenance. To meet these challenges, lighting system designs based on utilization of LEDs as sources of illumination have become an alternative approach.

The progress within LED technology has in turn stimulated the field of illumination optics, which previously related to lenses confined to such expensive niche application as stage lighting. A majority of illumination applications utilizes lenses that are circularly symmetric, enabling for a simplified design and mould-fabrication. Advances within the field, however, have resulted in new and improved ways to design illumination lenses that are not necessarily circularly symmetric. Modern injection-mould technology has full capability to fabricate arbitrary lens shapes, given their detailed mathematical description. Of the numerous illumination applications that have recently adapted LEDs as the light sources, many have lenses specifically designed for them.

One approach for a less bulky and more durable lighting arrangement implementing LEDs and such a specifically designed lens is for instance disclosed in EP2135005. In detail, EP2135005 presents an optical device having a lens for imparting a desired shape to a light beam, particularly relevant for lighting surfaces which have a great length with respect to their width, such as a road, a street or a motorway. With the disclosed lens, often quite bulky reflectors commonly arranged in the luminary head across the light path in order to direct the light beam with an appropriate angle toward e.g. the street, may be omitted.

However, even though EP2135005 provides an exemplary implementation of a lighting arrangement which may have a reduced thickness and hence be less bulky, there is still room for improvement with regards to compactness.

SUMMARY OF THE INVENTION

According to the invention, the above need is at least partly met by an optical device for forming a light beam, which optical device comprises a lens having a top section configured to receive light emitted by a light source, a bottom section configured to allow the received light to exit the lens, and a plurality of side sections stretching from the top section to the bottom section. The plurality of side sections enclose the lens and are adapted to reflect and refract incident rays of the received light. A cross-section of the lens, in a plane perpendicular to a centre axis stretching from the top section to the bottom section, has the shape of a polygon, which polygon is oriented in a lengthwise direction and in a transversal direction being perpendicular to each other. Furthermore, the lens is adapted such that the received light exits the lens as a light beam formed to an elongated shape at a predetermined distance from the optical device.

In presenting such an optical device, a compact lens enabling for a desired elongated illumination distribution is provided. In order to be able to receive light emitted by a light source, the lens has a top section configured therefore. The characteristics of the top section—such as the shape—may vary. One parameter affecting the design is for instance the characteristics of the light source from which the lens is configured to receive light. The light source may be represented by one LED or even a plurality thereof, whereby their number and disposition need to be considered by the designer. Furthermore, in order to allow received light to exit the lens, the lens has a bottom section configured therefore. Similarly to the top section, the characteristics of the bottom section may vary in accordance with the implementation at hand, and may hence have different shapes. The top and bottom sections may for instance be divergent, convergent, concave and/or convex, or a combination thereof, as long as the optical functions are maintained and comply with the application requirements at hand.

Furthermore, the lens has a plurality of side sections stretching from the top section to the bottom section enclosing the lens, which plurality of side sections are adapted to reflect and refract incident rays of the received light. The incident rays may hit the side sections in a wide range of angles, i.e. the incident angles may range from 0 to 90 degrees. By designing the side sections to both reflect and refract the incident rays, the light is allowed to be bent in favorable directions to thereby contribute to the light beam shaping. Accordingly, the plurality of side sections contribute to the angular distribution of the received light, thereby providing the designer with an extra parameter to control the light distribution.

Additionally, a cross-section of the lens, in a plane perpendicular to a centre axis stretching from the top section to the bottom section, has the shape of a polygon oriented in a lengthwise direction and in a transversal direction being perpendicular to each other. It should be noted that "the lengthwise direction and transversal direction being perpendicular to each other" here is intended to be interpreted to likewise include "the lengthwise direction and transversal direction being essentially perpendicular to each other", and accordingly include shapes slightly deviating from being absolute perpendicular. Side surfaces having such a polygon-shaped cross-section enables for a more compact optical device, which subsequently may be arranged in close disposition with further optical devices. The shapes of the respective side sections may vary in accordance with the implementation at hand, and may for instance be flat, divergent or convergent along the direction of the centre axis.

Furthermore, the lens is adapted such that the received light exits the lens as a light beam formed to an elongated shape at a predetermined distance from the optical device. Thereby, the characteristics of the top section, the bottom section and/or the respective side sections are adapted to shape light emitted from the light source into a light beam having substantially homogeneous light intensity lengthwise. The elongated shape results from different beam divergence in the lengthwise direction as compared to the transversal direction. According to one example, the bottom section is convex in both the lengthwise and transversal direction, with different curvatures. The lens is for instance adapted such that the elongated shape has the form of a "bat wing", or is essentially a rectangle projected at the predetermined distance. According to one example, such a rectangle may have dimensions within the range of 7-13 meters*30-40 meters, and preferably approximately 10 meters*36 meters, while the predetermined distance may be within the range of 5 to 11 meters, and preferably approximately 8 meters. Thereby, the presented optical device may be suitable for applications such as outdoor lighting, for instance street lighting along motorways or for parking places, city centers and/or shopping areas.

According to an embodiment, the plurality of side sections comprises four side sections, and the cross-section has the shape of a rectangle. It should be noted that "the shape of a rectangle" here is intended to be interpreted to likewise include "the shape of essentially a rectangle", and accordingly include shapes slightly deviating from a rectangle. With side surfaces having such a rectangular cross-section, a smaller sized lens is introduced.

According to another embodiment, the lens is—in the cross-section along the centre axis—symmetric in quadrants. That is, the lens is composed of four equal portions oriented around the centre axis. With such a symmetric solution, a simplified lens design is provided. An additional advantage is that mounting of the lens may be done with less chance of a mistake in orientation. Furthermore, in the case of a plurality of optical devices arranged in close proximity of each other, the symmetric solution results in less shielding from one lens to the other. That is, there is a reduced risk of one side being short and that of a neighboring side being long, resulting in part of the light from one optical device hitting the other optical device and disturbing the light path.

Figure 4:
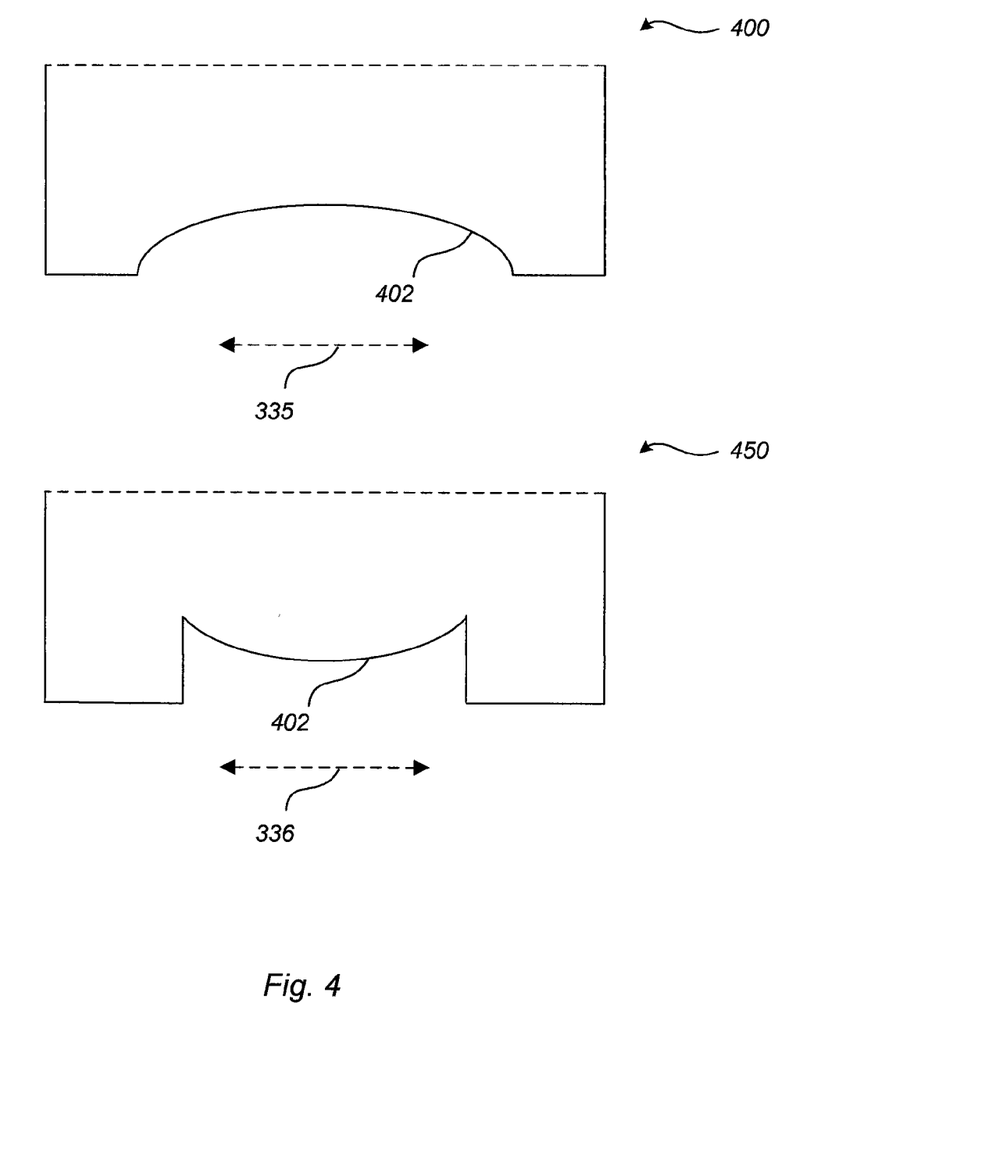
FIG. 4 illustrates a top portion of an optical device of a preferred embodiment.

According to yet another embodiment, as illustrated in partial cross-section 400 in FIG. 4, the top section 402 is divergent in the lengthwise direction 335 and, as illustrated in partial cross-section 450 in FIG. 4, is convergent in the transversal direction 336. With such a design, the lens enables for light received by the top section to be spread out in the lengthwise direction, while being collected in the transversal direction.

Furthermore, according to yet another embodiment, as illustrated in partial cross-section 400 in FIG. 4, the top section 402 has a first concavity in the lengthwise direction 335 and, as illustrated in partial cross-section 450 in FIG. 4, has a second concavity in the transversal direction 336 which second concavity is greater than the first concavity. Thereby, a feasible shape of the top section is suggested, providing desired diversity of the received light.

According to an additional embodiment, the bottom section is divergent in both the lengthwise and the transversal direction, with the bottom section being stronger divergent in the lengthwise direction than in the transversal direction. Thereby, the lens enables for the light beam exiting the bottom section to be spread out in both the lengthwise and the transversal direction, with stronger spreading in the former than the latter. One example is the bottom section having the shape of a saddle.

Generally, the lens may be of any transparent material with varying index and refraction characteristics—the choice affecting the design. According to one embodiment, however, the lens comprises PMMA (polymethyl methacrylate). Thereby, a material having a refractive index of 1.49 is utilized, suitable for a wide variety of applications.

According to yet another embodiment, at least one of the plurality of side sections is optically flat. Thereby, with the absence of surface roughness or micro structures, the side section(s) are not diverging incident light. In one example, all side sections are optically flat.

In addition to the above stated, the inventive optical device described in the foregoing is preferably comprised in a lighting arrangement further comprising a light source arranged on a carrier. The lighting arrangement provides similar advantages as discussed above in relation to the optical device. The carrier is a medium on which the light source is provided, and may for instance be a PCB.

According to an embodiment, the light source comprises one or a plurality of LEDs (light emitting diodes). Thereby, an energy-efficient and long-lasting light source is selected. By implementing not only one but a plurality of LEDs, additional functionality may be gained. Preferably, the LEDs are adjacently arranged on the carrier. It should be noted that "adjacently arranged" here is intended to be interpreted to likewise include "arranged in close proximity" and "relatively closely arranged". According to one example, the light source comprises 9 LEDs positioned in a 3*3 essentially square-shaped matrix. "Essentially square-shaped" is in the context of this application intended to be interpreted in a broad sense, likewise including "close to square-shaped", "almost square-shaped", and "as square-shaped as possible", thus including minor deviations from a square-shaped matrix. With such a selection of the number of LEDs and their positioning in relation to each other, an efficient disposition enabling for a compact lens is provided. An alternative number of LEDs and alternative positioning is naturally covered by the scope; for instance the number of LEDs may range from 1 to 30. The plurality of adjacently arranged LEDs covered by a single lens represents a compact solution, whereby issues related to a large system with spread out LEDs having individual lenses may be overcome. Costly and unreliable fixing and aligning of each LED with a respective individual lens are avoided, whereby manufacturing and assembly is facilitated. Furthermore, the single lens requires less material than a plurality of lenses. Additionally and/or alternatively to a more compact solution, the single common lens enables for an increased number of LEDs to be arranged on a given area. Accordingly, more lumen/area may be provided and/or LEDs of different characteristics such as color may be combined to provide light with desired characteristics. For instance, for one implementation, functional light with high flux may be of major importance rather than a high color rendering index (CRI) or high color temperature (CCT), why LEDs with characteristics providing efficient lumen/area may be combined. For another implementation, good CRI may be required, why LEDs with high CRI may be combined with a small penalty on flux.

For some light sources, heat sinks for cooling of the light source may not be possible to implement should they block the light emitting side of the light source. This may be problematic for instance when utilizing LEDs, and specifically high power LEDs having relatively high power density/area.

Consequently, cooling via conduction into and through the carrier has become more important. According to yet another embodiment, the carrier may hence comprise one of an IMS (insulated metal substrate) and an MCPCB (metal core printed circuit board). Thereby, an improvement in heat extraction is provided, in that an IMS or an MCPCB is superior in comparison to for instance a traditional PCB when it comes to heat conduction. Additionally, the more efficient cooling provided by the IMS or MCPCB may assist in enabling implementations with more closely arranged LEDs.

According to an additional embodiment, the lighting arrangement further comprises conductive pathways arranged on a surface of a component region of a dielectric layer of the carrier, which conductive pathways are adapted to convey current and electric signals to/from the light source. A propagation area of the conductive pathways is optimized in relation to space available on the surface. In the context of this application, the conductive pathways comprise the pad (e.g. copper pad) on which the light source—or pads on which a plurality of LEDs—is arranged on the dielectric layer. The conductive pathways may furthermore comprise the conductive tracks (e.g. copper tracks) leading to/from the light source or the plurality of LEDs. The conductive pathways may accordingly represent the electrical circuit layout. With the enlarged propagation area of the conductive pathways, a substantial part of the surface of the component region is covered. Thereby, even further improvement in heat extraction is provided in that thermal heat originating from the light source may be spread over a larger area of the dielectric layer. Accordingly, the power density (thermal power per area) and subsequently the temperature of the light source may be lowered in an efficient manner. With the improved heat extraction comes the improved ability to implement a greater number of LEDs, and/or LEDs being more closely arranged on the carrier. The space available on the surface of the component region is for instance restricted by the need for creepage and clearance distances, as well as mechanical screw holes. Optimized may for some implementations be synonymous with maximized, whereby the propagation area of the conductive pathways covers as much as possible of the space available on the surface of the component region. It should be noted that "maximized" should be interpreted in a broad sense, likewise including "essentially maximized" and "close to maximized", thus including minor deviations from absolute maximization. Preferably, in implementations where the light source comprises a plurality of LEDs, each LED is provided with a pad being enlarged in close vicinity of the LED. Should the disposition of the LEDs not allow for such an enlargement, for instance for a LED being surrounded by other closely arranged LEDs, the pad of that LED is preferably connected to the surrounding LED pad territories in such a way that said pad is of similar area ratio as those of the surrounding LEDs.

According to an embodiment, the propagation area covers preferably at least 50%, and most preferred at least 60%, of the surface. Thereby, the propagation area covers a considerate part of the surface of the component area of the dielectric layer for lowering of thermal power density. For some implementations, the propagation area covers as much as at least 70% of the surface.

According to yet another embodiment, the conductive pathways are derived from a common metal layer. Thereby, the conductive pathways may be derived from the same manufacturing process in an efficient manner. The material of the metal layer may for instance be copper or a foil comprising silver. Deriving the conductive pathways from a common metal layer may involve different patterning methods, for instance subtractive methods such as silk screen printing, photoengraving and PCB milling that removes the e.g. copper. Alternatively, the patterning may be an additive process, for instance printing the metal layer onto the dielectric layer. Furthermore, additional e.g. copper may in a subsequent step be added in a galvanic process.

To improve cooling even further, in one example, the lighting arrangement may additionally comprise a thermally conductive metal layer, which metal layer is arranged such that the dielectric layer is positioned between the conductive pathways and the metal layer. Thereby, the carrier is adapted to conduct heat originating from the light source through the insulating layer to the metal layer for yet improved heat spreading and cooling of the light source.

Furthermore, a plurality of the lighting arrangements of the kind described in the foregoing are preferably arranged in a matrix, and comprised in a lighting system. The lighting system is adapted such that a first light beam and first predetermined distance of a first lighting arrangement is similar to a second light beam and second predetermined distance of a second lighting arrangement. Accordingly, in addition to providing similar advantages as discussed above in relation to the lighting arrangement, the lighting system enables for advantages related to the combination of a plurality of lighting arrangements. It should be noted that each lighting arrangement may comprise a respective carrier, although preferably, at least some of the plurality of lighting arrangements are provided on the same carrier. The lighting arrangements are for instance disposed in an essentially square-shaped or rectangular matrix, although other dispositions naturally are feasible. By arranging a plurality of lighting arrangements having similar light beams and similar target distances clustered together, more light, i.e. more lumen, may be concentrated onto a target surface. As the lighting system preferably is configured to be arranged with a lighting pole, such a target surface may be a road section. Additionally and/or alternatively, with the more compact lens suggested by the present invention, the lighting arrangements may be more closely disposed and the lighting system hence more compact.

Further features of, and advantages with the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
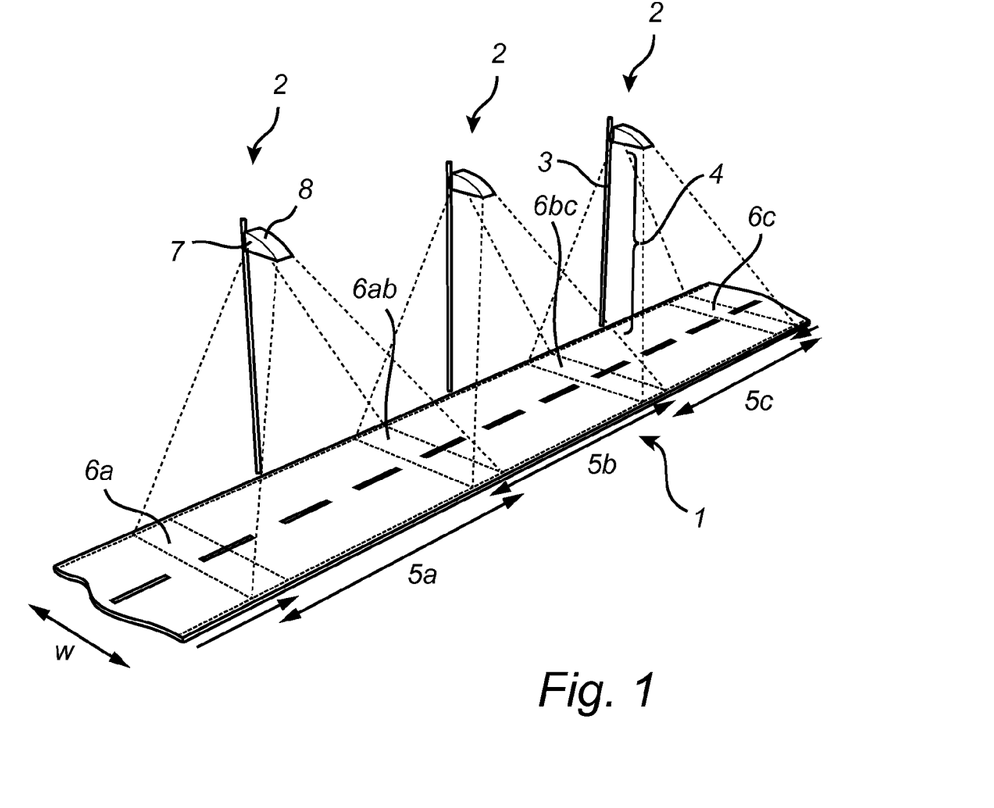
FIG. 1 illustrates an exemplifying schematic perspective view of a road section with a plurality of lighting systems according to a preferred embodiment of the present invention.

Referring now to the figures and to FIG. 1a in particular, there is provided an exemplifying schematic perspective view of a road section 1 with a plurality of lighting systems 2 according to a preferred embodiment of the invention. Each lighting system 2 is arranged on a respective lighting pole 3, the length of each lighting pole 3 being adapted for the implementation at hand. Here, each lighting pole 3 has such a length that a target distance 4 from the optical device to the road is approximately 8 meters. Each lighting system 2 enlightens a respective street zone 5a, 5b, 5c, having a width W. The dimensions of each street zone 5 may vary; here however, the elongated shape is a rectangle of approximately 10 meters*36 meters. The lighting poles 3 are arranged at a distance from each other and/or the lighting systems 2 are adapted such that the enlightened street zones 5 may be slightly overlapping in overlapping zones 6a, 6ab, 6bc, 6c.

In order to enlighten the respective street zones 5, each lighting system 2 comprises a support structure 7 on which a plurality of lighting arrangements 8 are arranged in a matrix. The number of lighting arrangements 8 for each lighting system 2 may vary along with their disposition in relation to each other, for instance ranging from 4 to 64 arranged in a square-shaped or rectangular matrix. For each lighting arrangement 8 of a lighting system 2, a light beam resulting from one lighting arrangement 8 is similar to a light beam resulting from another lighting arrangement 8. Accordingly, by allowing each respective lighting system 2 to comprise a plurality of lighting arrangements 8 clustered together having similar light beams and similar target distances 4, more light, i.e. more lumen, is concentrated onto the respective street zone 5. Further details with regards to a lighting arrangement 8 of FIG. 1 will now be discussed with reference to FIG. 2.

Figure 2:
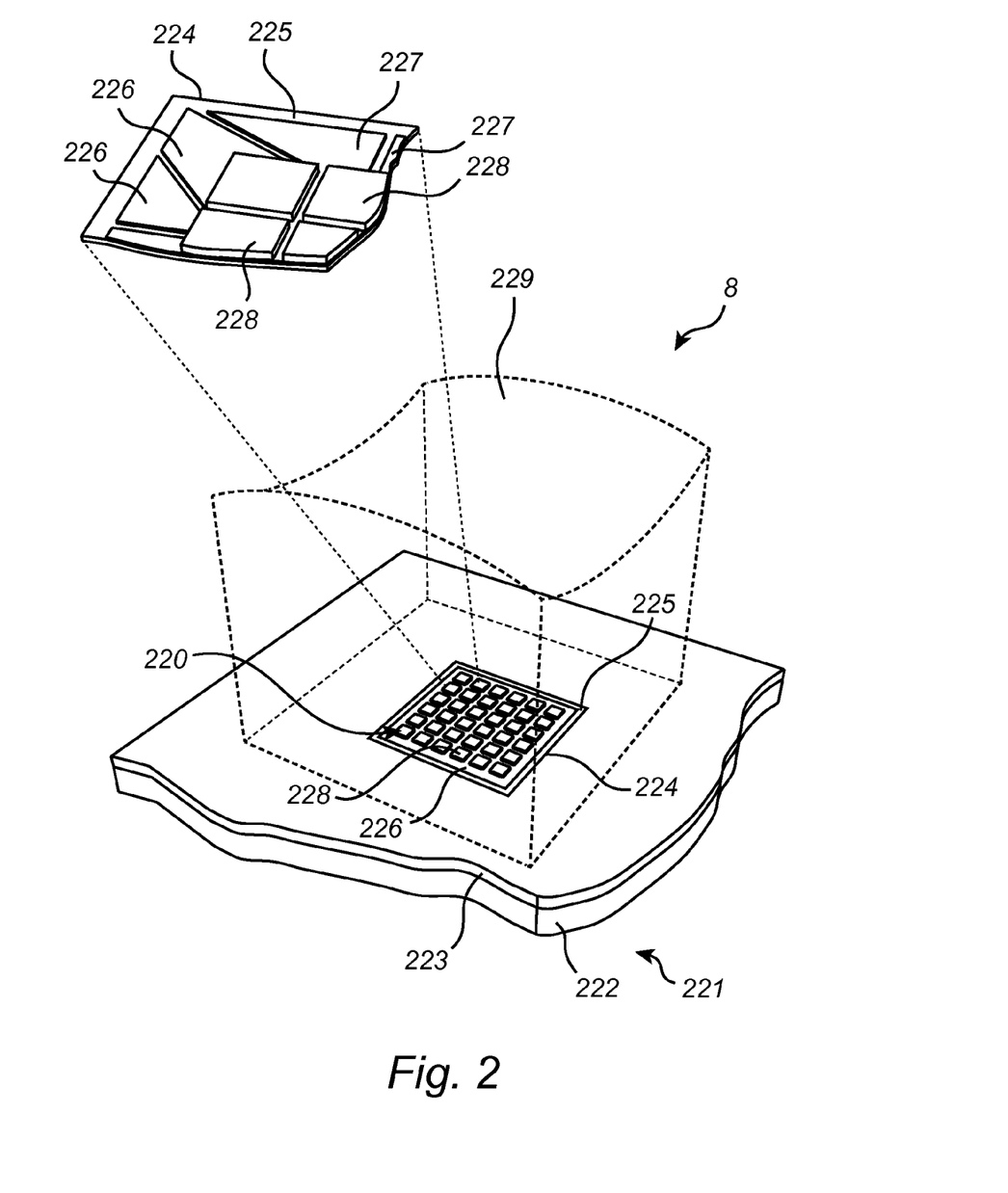
FIG. 2 is a perspective view of one of the lighting arrangements of the preferred embodiment.

In FIG. 2, it is shown that a lighting arrangement 8 comprises a light source 220 arranged on a carrier 221. For simplicity only one lighting arrangement 8 is illustrated; in reality however, a plurality of lighting arrangements 8 are provided on the same carrier 221. According to the shown embodiment, the light source 220 comprises a plurality of LEDs 228—here 30 LEDs arranged on an area or 5 mm*6 mm. It should be noted that according to alternative implementations, the light emitting size of the light source 220 may take on different values and range for instance from 4-6 mm*5-7 mm, and the number of LEDs may be another. With the LEDs 228 being arranged in close proximity to each other, a compact solution is provided enabling for more lumen/area to be supported and/or more LEDs of different characteristics to be combined.

The carrier 221 is here represented by an IMS (insulated metal substrate), although according to alternative embodiments, other options such as an MCPCB (metal core printed circuit board) or a PCB are feasible. It should be emphasized that layers and/or components other than those described hereinafter may be comprised in or on the carrier 221. As a bottom layer, to conduct heat originating from the light source 220, the carrier 221 comprises an optional thermally conductive metal layer 222. The thermally conductive metal layer 222 may for instance be of aluminium or copper, with a thickness preferably ranging from 0.5 mm to 3.2 mm. On top of the metal layer 222 may an adhesive layer be arranged (not shown), and on top of that a dielectric layer 223. The dielectric layer 223 is for instance an electrically insulating polyamide film. Optionally, the dielectric layer 223 may comprise a polymer with metal oxide, or an aluminium oxide on top of which a thin insulating coating is provided. Alternatively, the dielectric layer 223 may comprise ceramic.

The dielectric layer 223 has a component region 224 adapted for receiving components, e.g. the light source 220. The component region 224 has a surface 225, on which conductive pathways 226 are arranged. The conductive pathways 226 are adapted to convey current and electric signals to/from the light source 220 and/or other components. Accordingly, the conductive pathways 226 comprise the pads on which the plurality of LEDs 228 are arranged on the dielectric layer 223. Here, the conductive pathways 226 furthermore comprise conductive tracks leading to/from the plurality of LEDs 228 (not shown). In FIG. 2, the conductive pathways 226 are derived from a common copper layer.

In order to improve heat spreading from the light source 220, a propagation area 227 of said conductive pathways 226 is optimized in relation to space available on the surface 225 of the component region 224. With the enlarged propagation area 227 of the conductive pathways 226, a substantial part of the surface 225 of the component region 224 is covered, whereby thermal heat originating from the light source 220 may be spread over a larger area of the dielectric layer 223. Here, optimized is synonymous with maximized, whereby the propagation area 227 covers as much as possible of the space available on the surface 225 of the component region 224. According to the shown embodiment, the propagation area covers more than 50% of the surface 225. Note however, that according to alternative implementations, the propagation area may cover more than 60%, or even more than 70%, of the surface 225.

The lighting arrangement 8 furthermore comprises an optical device 229 for forming a light beam. It should be noted that the component region 224 here shown is completely covered by the optical device 229; however, according to alternative embodiments, the component region 224 may stretch outside that coverage. The optical device 229 will now be described in further detail with reference to FIG. 3.

Figure 3:
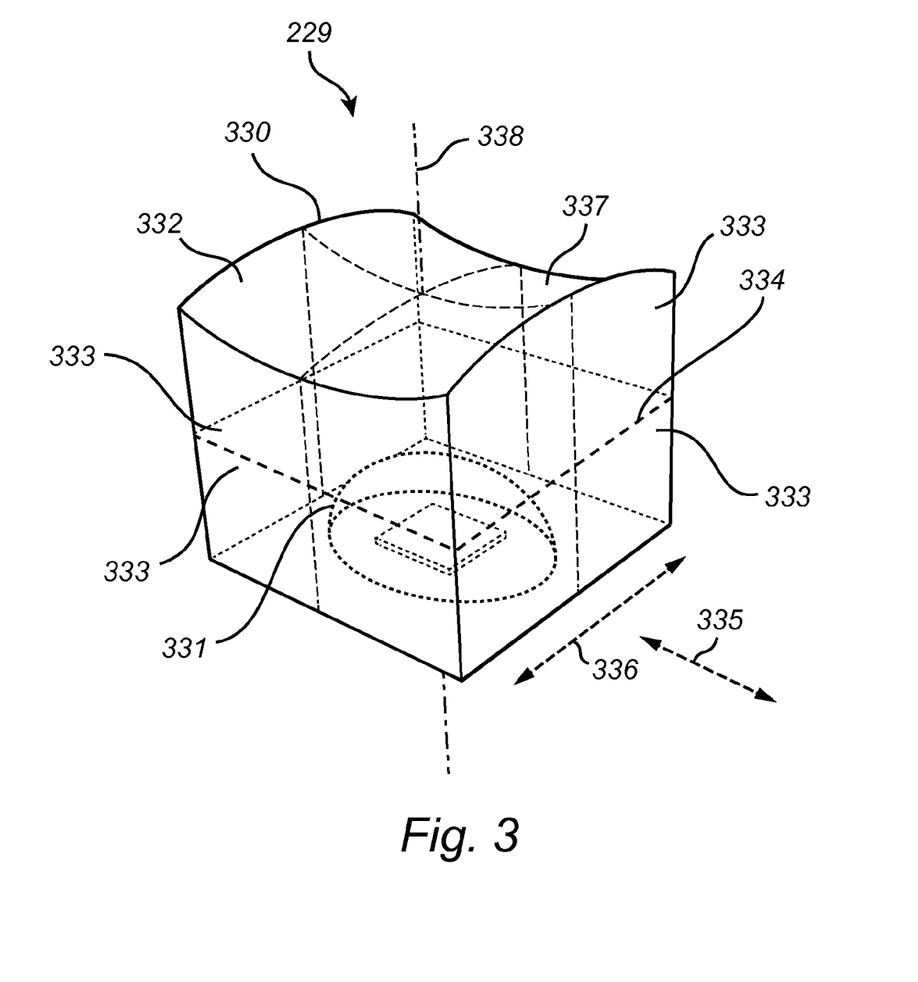
FIG. 3 illustrates one of the optical devices of the preferred embodiment.

In FIG. 3, it is shown that the exemplifying optical device 229 comprises a lens 330. The material of the lens 330 is here PMMA, although for other implementations the lens 330 may be made of any transparent colored or colorless shaped material, such as glass, polymethacrylate or other plastics. The lens 330 has a top section 331 configured to receive light emitted by the light source 220, and a bottom section 332 configured to allow the received light to exit the lens 330. The lens 330 furthermore has a plurality of side sections 333—here four—stretching from the top section 331 to the bottom section 332, enclosing the lens 330. The side sections 333 are adapted to reflect and refract incident rays of the received light. A cross-section 334, in a plane perpendicular to a centre axis 338 stretching from the top section 331 to the bottom section 332, has the shape of a polygon—here a rectangle. The rectangle of cross-section 334 is oriented in a lengthwise direction 335 and in a transversal direction 336 being perpendicular to each other. With such side sections 333, the lens 229 has a compact design, whereby the lighting arrangements 8 may be more closely disposed and the lighting system 2 hence be more compact. Furthermore, the lens 330 is adapted such that the received light exits the lens 330 as a light beam formed to an elongated shape at a predetermined distance from the optical device 229. For the shown implementation of FIG. 1, the elongated shape is represented by the respective street zones 5a, 5b, 5c, and the predetermined distance represented by the target distance 4.

In the exemplifying embodiment, the lens 330 is symmetric in quadrants 337 in the cross-section 334 along the centre axis 338. Furthermore, the top section 331 has a first concavity in the lengthwise direction 335 and a second concavity in the transversal direction 336—the latter being greater than the former. The bottom section 332 on the other hand is divergent in both the lengthwise 335 and the transversal direction 336, with a stronger divergence in the lengthwise direction 335 than in the transversal direction 336. Additionally, the side sections 333 are optically flat, hence lacking surface roughness or micro structures which may diverge incident light.

Thereby, with the preferred described embodiment, an optical device 229 is provided, comprising a compact lens 330 enabling for a desired illumination distribution 5a, 5a, 5b, 5c. Furthermore, as shown, a plurality of lighting arrangements 8 may be more closely disposed allowing for a lighting system 2 to be more compact.

In the exemplary embodiments of the present invention described above, the light sources comprise LEDs. It would however be possible, and within the scope of the present invention, to use different types of light sources, such as organic light emitting diodes (OLEDs), polymeric LEDs (PLEDs), inorganic LEDs, lasers, or a combination thereof, as well as a wide-band (direct of phosphor converted) LED and wide-band (phosphor converted) white LEDs. Furthermore, combinations with other light sources like TL, CFL are also possible.

Additionally, it should be emphasized that any combination of LED colors can produce a gamut of colors, whether the LEDs may be red, green, blue, amber, white, orange, UV or other colors. The various embodiments described throughout this specification encompass all possible combinations of LEDs comprised in the light module, such that light of varying color, intensity, saturation and color temperature can be produced.

It should be noted that the lighting system furthermore may comprise any number of optical and/or non-optical components to provide a variety of optical effects. These components may include, but are not limited to, diffusers and the like, used in different combinations to provide a desired effect.

Furthermore, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. An optical device for forming a light beam, said optical device comprising a lens having:
    a top section configured to receive light emitted by a light source;
    a bottom section configured to allow said received light to exit said lens; and
    a plurality of side sections stretching from said top section to said bottom section, said plurality of side sections enclosing said lens and being adapted to reflect and refract incident rays of said received light, wherein a cross-section of said lens, in a plane perpendicular to a centre axis stretching from said top section to said bottom section, has the shape of a polygon, said polygon being oriented in a lengthwise direction and in a transversal direction being perpendicular to each other,
    wherein said lens is adapted such that said received light exits said lens as a light beam formed to an elongated shape at a predetermined distance from said optical device, wherein said top section is divergent in said lengthwise direction and convergent in said transversal direction.

2. The optical device according to claim 1, wherein said plurality of side sections comprises four side sections, said cross-section having the shape of a rectangle.

3. The optical device according to claim 1, wherein said lens in said cross-section along said centre axis is symmetric in quadrants.

4. The optical device according to claim 1, wherein said top section has a first concavity in said lengthwise direction and a second concavity in said transversal direction, said second concavity being greater than said first concavity.

5. The optical device according to claim 1, wherein said bottom section is divergent in both said lengthwise and said transversal direction, said bottom section being stronger divergent in said lengthwise direction than in said transversal direction.

6. The optical device according to claim 1, wherein said lens comprises PMMA.

7. The optical device according to claim 1, wherein at least one of said plurality of side sections is optically flat.

8. A lighting arrangement, comprising:
    a light source arranged on a carrier, and
    an optical device according to claim 1.

9. The lighting arrangement according to claim 8, wherein said light source comprises one or a plurality of LEDs (light emitting diodes).

10. A lighting system, comprising:
    a plurality of lighting arrangements according to claim 8 arranged in a matrix, wherein said lighting system is adapted such that a first light beam and first predetermined distance of a first lighting arrangement is similar to a second light beam and second target distance of a second lighting arrangement.

11. An optical device for forming a light beam, said optical device comprising a lens having:
    a top section configured to receive light emitted by a light source;
    a bottom section configured to allow said received light to exit said lens; and
    a plurality of side sections stretching from said top section to said bottom section, said plurality of side sections enclosing said lens and being adapted to reflect and refract incident rays of said received light, wherein a cross-section of said lens, in a plane perpendicular to a centre axis stretching from said top section to said bottom section, has the shape of a polygon, said polygon being oriented in a lengthwise direction and in a transversal direction being perpendicular to each other,
    wherein said lens is adapted such that said received light exits said lens as a light beam formed to an elongated shape at a predetermined distance from said optical device, wherein said optical device is longer in said lengthwise direction than in said traverse direction, and wherein said top section has a first concavity in said lengthwise direction and a second concavity in said transversal direction, said second concavity being greater than said first concavity.

* * * * *